United States Patent [19]

Van Sloun

[11] 4,383,294
[45] May 10, 1983

[54] VOLTAGE DOUBLER WITH DELAYED LOADING

[76] Inventor: Peter H. Van Sloun, 207 - 18th Ave. N., Hopkins, Minn. 55343

[21] Appl. No.: 257,306

[22] Filed: Apr. 23, 1981

[51] Int. Cl.³ .............................................. H02M 7/00
[52] U.S. Cl. .......................................... 363/60; 320/1; 307/110
[58] Field of Search ............................ 363/59, 60, 61; 307/110; 320/1

[56] References Cited

U.S. PATENT DOCUMENTS 3,820,004  6/1974  Sugiura et al. .................... 363/60
3,944,908  3/1976  Oki ...................................... 363/60

FOREIGN PATENT DOCUMENTS 1588768  12/1970  Fed. Rep. of Germany ...... 307/110
379956  6/1973  U.S.S.R. ............................. 363/60

*Primary Examiner*—William M. Shoop
*Assistant Examiner*—Peter S. Wong

[57] ABSTRACT

A voltage doubler power supply for deriving power from a unidirectional source, including a driver and means preventing current flow until after a first positive alternation of the driver.

3 Claims, 1 Drawing Figure

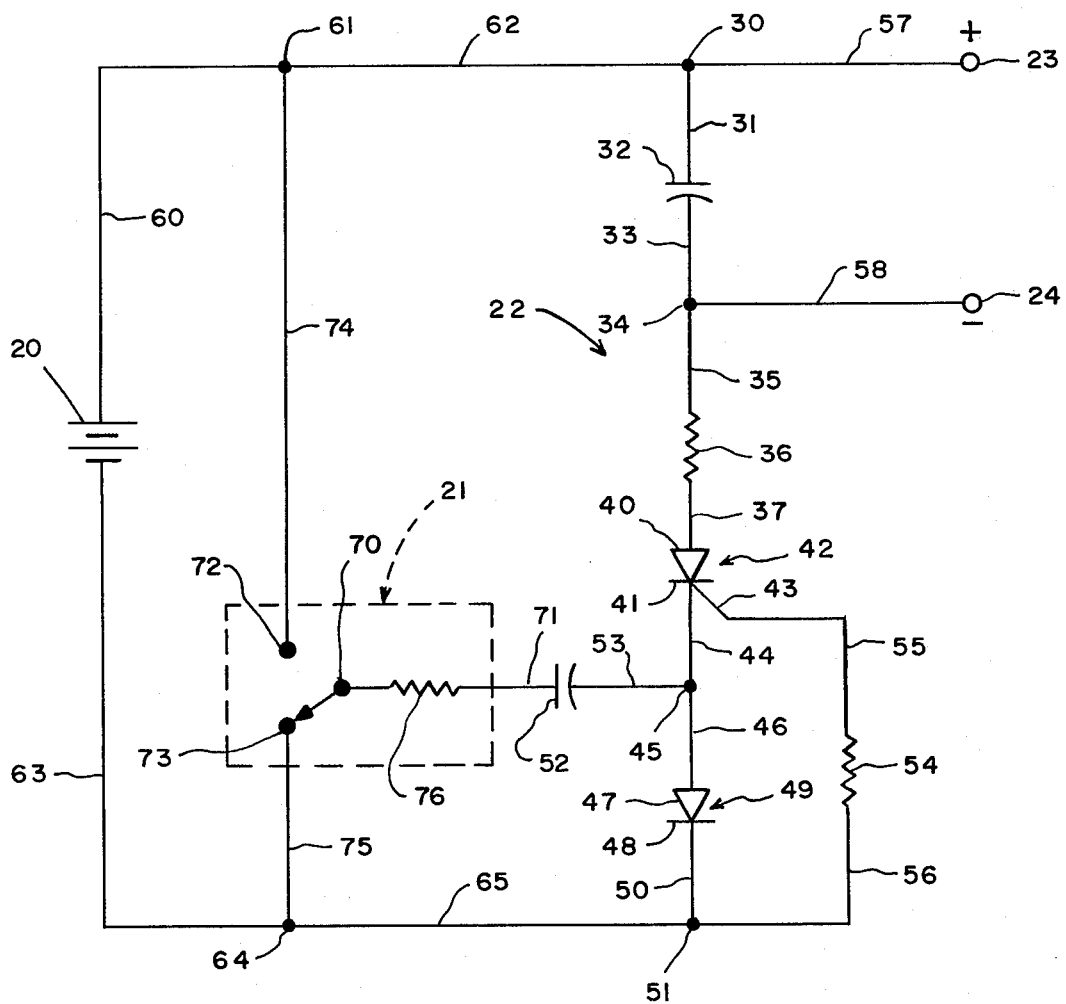

VOLTAGE DOUBLER WITH DELAYED LOADING

The Government has rights in this invention pursuant to Contract No. FO8635-79-C-0058 awarded by the Department of the Air Force.

TECHNICAL FIELD

This invention relates to the field of electronics, and particularly to voltage multiplier power supplies.

BACKGROUND OF THE INVENTION

In the field of electronics, applications often arise in portable equipment for a source of unidirectional voltage of limited current output. Voltage doublers and like units are known which function to minimize the weight and space necessary for batteries in such equipment, by supplying a useful voltage greater than that of the actual batteries. Such circuits traditionally comprise a continual leakage load on the batteries, even when not functioning.

Modern "reserve" batteries are available in which an electrolyte is contained in separate storage for long periods, but may be released when desired: when the electrolyte is released an interval is required for the battery to develop its full power and this interval of slowly rising voltage is unduly protracted if there is a load on the battery during the period.

SUMMARY OF THE INVENTION

The present invention comprises a voltage doubler for connection to a battery through a suitable driver or switching arrangement, characterized by offering no load on the battery until driver operation is initiated, so that battery voltage rise is not impeded.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

The single FIGURE of the drawing is a wiring diagram of a voltage doubler according to the invention.

DESCRIPTION OF THE PREFERRED EMBODIMENT

In the drawing a battery 20 is connected through a driver 21 and a voltage doubler 22 to supply a unidirectional output voltage at terminals 23, 24 which is essentially double that of the battery.

Voltage doubler 22 comprises a series circuit which may be traced from a junction point 30 through conductor 31, a first capacitor 32, conductor 33, a junction point 34, conductor 35, a limiting resistor 36, conductor 37, the anode 40 and cathode 41 of a silicon controlled rectifier 42 having a gate electrode 43, conductor 44, a junction point 45, conductor 46, the anode 47 and cathode 48 of a diode 49, and conductor 50 to a junction point 51. A second capacitor 52 has one electrode connected to junction point 45 by conductor 53, and a resistor 54 is connected by conductors 55 and 56 to gate electrode 43 and junction point 51.

Output terminals 23 and 24 are connected to junction points 30 and 34 by conductors 57 and 58.

The anode of battery 20 is connected to junction point 30 through conductor 60, a junction point 61, and conductor 62. The cathode of battery 20 is connected to junction point 51 through conductor 63, a junction point 64, and conductor 65.

Driver 21 may be of any suitable structure, and is shown only functionally: it acts as a contact 70 connected by a conductor 71 to capacitor 52, and movable between a pair of fixed contacts 72 and 73 connected by conductors 74 and 75 to junction points 61 and 64. When driver 21 is not in operation, contact 70 engages contact 73. The internal impedance of driver 21 is suggested at 76.

OPERATION

Before driver 21 is in operation, capacitor 52 is connected in circuit with conductor 71, impedance 76, contacts 70, 73 conductors 75, 65 and 50, diode 47, and conductors 46 and 53, and draws no charging or leaking current. Silicon controlled rectifier 42 remains off, isolating capacitor 32 so that it can draw neither charging or leakage current. There is thus no load on battery 20.

The first positive alternation of driver 21 charges capacitor 52 through a circuit which may be traced from the positive pole of the battery 20 through conductor 60, junction point 61, conductor 74, contacts 72 and 70, impedance 76 and conductor 71, the circuit being completed through conductor 53, junction point 45, conductor 46, diode 47, conductor 50, junction point 51, conductor 65, junction point 64, and conductor 63 to the negative battery terminal. The charging current is limited by the internal impedance 76 of driver 21.

Junction point 45 is now negative with respect to junction point 30, by practically the battery voltage, but silicon controlled rectifier 42 is held off, being back biased cathode to gate electrode, so that capacitor 32 is not charged at this time.

The first negative alternation of driver 21 drives junction point 45 negative by the sum of the battery voltage added to the charge on condenser 52. This turns silicon controlled rectifier 42 on, by cathode triggering through resistor 54, junction point 51 being instantaneously more positive than cathode 41. At the instant of triggering, the impedance of the silicon controlled rectifier is less than that of driver 21 which draws diode 47 back to a forward bias condition. A current for charging capacitor 32 now flows from battery 20 through conductor 60, junction point 61, conductor 62, junction point 30, conductor 31, capacitor 32, conductor 33, junction point 34, conductor 35, resistor 36, conductor 37, silicon controlled rectifier 42, conductor 44, junction point 45, conductor 46, diode 49, conductor 50, junction point 51, conductor 65, junction point 64, and conductor 63 to battery 20, and this current is limited by the resistance of resistor 36, which is large compared with the impedance of silicon controlled rectifier 42. An additional current for charging capacitor 32 also flows from battery 20 thru conductor 60, junction point 61, conductor 62, junction point 30, conductor 31, capacitor 32, conductor 33, junction point 34, conductor 35, resistor 36, conductor 37, silicon controlled rectifier 42, conductor 44, junction point 45, conductor 53, capacitor 52, conductor 71, driver 21, conductor 75, junction point 64, and conductor 63 to battery 20, and this is limited by impedance 76 which is larger than resistor 36. Junction point 34 reaches a voltage point negative with respect to junction point 30, but positive with respect to junction point 51.

The second positive alternation again charges capacitor 52, but the second negative alternation does not cause forward biasing of diode 49, and the circuit now operates as a voltage doubler in which members 42 and 49 are the rectifiers.

From the foregoing it will be evident that the invention comprises a voltage doubler with delayed loading on its voltage source, and with accelerated operation during the first negative alternation of the driver.

Numerous characteristics and advantages of the invention have been set forth in the foregoing description, together with details of the structure and function of the invention, and the novel features thereof are pointed out in the appended claims. The disclosure, however, is illustrative only, and changes may be made in detail especially in matters of shape, size, and arrangement of parts, within the principle of the invention, to the full extent indicated by the broad general meaning of the terms in which the appended claims are expressed.

I claim:

1. A power supply comprising, in combination:
   a source of unidirectional voltage, comprising a reserve battery, having first and second terminals of opposite polarity;
   a series circuit connected across said source including in sequence a first capacitor and first and second unidirectional conductors oriented for conduction in the same direction to charge said first capacitor from said source;
   means for connecting a load, to be energized from said source, across said first capacitor;
   a second capacitor having a first terminal, connected to said series circuit between said unidirectional conductors, and a second terminal;
   switching means energizable to alternately connect said second terminal of said second capacitor to said terminals of said source;
   and means, including one of said unidirectional conductors, initially preventing flow of current from said source, and effective after a first positive alternation of said switching means to enable flow of current from said source.

2. A power supply according to claim 1 in which the internal impedance of said switching means is greater than the impedance of said one of said unidirectional conductors.

3. A power supply according to claim 1 in which said one of said unidirectional conductors comprises a silicon controlled rectifier having a gate electrode connected to the negative terminal of said source.

* * * * *